(12) United States Patent
Chappel

(10) Patent No.: US 9,808,975 B2
(45) Date of Patent: Nov. 7, 2017

(54) COLLAPSIBLE CORE OF A MOLD FOR FORMING INTERNAL FEATURES SUCH AS THREADS

(71) Applicant: Paradise Mold and Die LLC, Cleveland, OH (US)

(72) Inventor: Richard Chappel, Independence, OH (US)

(73) Assignee: Paradise Mold and Die LLC

( * ) Notice: Subject to any disclaimer, the term of this patent is extended or adjusted under 35 U.S.C. 154(b) by 932 days.

(21) Appl. No.: 13/998,358

(22) Filed: Oct. 24, 2013

(65) Prior Publication Data

US 2015/0115502 A1  Apr. 30, 2015

(51) Int. Cl.
*B29C 45/44* (2006.01)
*B29C 45/26* (2006.01)

(52) U.S. Cl.
CPC ...... *B29C 45/4421* (2013.01); *B29C 45/2618* (2013.01)

(58) Field of Classification Search
CPC ................. B29C 45/2618; B29C 45/4421
See application file for complete search history.

(56) References Cited

U.S. PATENT DOCUMENTS

| | | | |
|---|---|---|---|
| D28,764 S | 5/1898 | Burdick | D15/135 |
| D187,440 S | 3/1960 | Tupper | D15/90 |
| D227,528 S | 7/1973 | Schad et al. | D8/382 |
| 3,843,088 A | 10/1974 | McLoughlin et al. | 249/144 |
| 4,021,180 A | 5/1977 | Smith | 425/392 |
| 4,125,246 A | 11/1978 | Von Holdt | 249/58 |
| 4,209,161 A | 6/1980 | Horvath | 249/180 |
| 4,286,766 A | 9/1981 | Von Holdt | 249/144 |
| 4,362,291 A | 12/1982 | Fuke et al. | 249/144 |
| 4,378,928 A | 4/1983 | Kopp et al. | 249/63 |
| 4,385,877 A | 5/1983 | Tanabe | 425/3 |
| 4,533,312 A | 8/1985 | Von Holdt | 425/438 |
| 4,627,810 A | 12/1986 | Von Holdt | 425/557 |
| 4,919,608 A | 4/1990 | Catalanotti et al. | 425/556 |
| 4,938,679 A | 7/1990 | Pietrorazio | 425/437 |
| 5,219,594 A | 6/1993 | Meyer et al. | 425/577 |
| 5,387,389 A | 2/1995 | Catalanotti et al. | 264/318 |
| 5,403,179 A | 4/1995 | Ramsey | 425/577 |
| 5,622,736 A | 4/1997 | Brown et al. | 425/556 |
| 5,624,694 A | 4/1997 | Delaby et al. | 425/577 |
| 5,630,977 A | 5/1997 | Catalanotti et al. | 264/318 |
| 5,700,415 A | 12/1997 | Hiroki et al. | 264/318 |
| 6,099,785 A | 8/2000 | Schweigert et al. | 264/328.1 |
| 6,506,330 B1 | 1/2003 | Schweigert et al. | 264/318 |

(Continued)

*Primary Examiner* — Ryan Ochylski
(74) *Attorney, Agent, or Firm* — David A. Burge

(57) ABSTRACT

A collapsible core of an injection mold includes relatively movable components arrayed about an imaginary centerline. When in an operational position for molding a new product, the movable components each define a separate segment of the exterior of the core, such as side by side segments of interior features such as a continuous set of threads to be formed in a product being molded. To move between operational and retracted positions, some core components are pivotally connected to a nest of the core, and others are translatably connected to the nest. When a newly molded product is ejected from the mold, ejection movement causes the pivotally connected core components to pivot to disengage the newly formed interior features, and causes the translatably connected components to translate to disengage the newly formed interior features.

18 Claims, 14 Drawing Sheets

(56) References Cited

U.S. PATENT DOCUMENTS

| | | | |
|---|---|---|---|
| D550,257 S | 9/2007 | Schad et al. | D15/135 |
| D550,258 S | 9/2007 | Schad et al. | D15/135 |
| 7,293,341 B2 | 11/2007 | Zydron | 29/450 |
| D631,073 S | 1/2011 | Papa et al. | D15/135 |
| 8,002,538 B2 | 8/2011 | Zydron | 425/417 |
| D645,066 S | 9/2011 | Sakae | D15/136 |
| D696,317 S | 12/2013 | Carper | D15/136 |
| 8,602,768 B2 | 12/2013 | Gastesi et al. | 425/438 |

COLLAPSIBLE CORE OF A MOLD FOR FORMING INTERNAL FEATURES SUCH AS THREADS

REFERENCE TO CONCURRENTLY FILED APPLICATION

The attention of the Office is directed to the filing concurrently herewith by the inventor hereof of a Design Application entitled SET OF SIX COMPONENTS OF A COLLAPSIBLE CORE OF A MOLD 29/463,349, the disclosure of which design application is incorporated herein by reference.

FIELD OF THE INVENTION

The present invention relates to the formation of interior features within products formed by injection molding of thermoplastic materials.

More particularly, the present invention relates to the provision and use of injection molds having novel and improved collapsible cores that utilize uniquely configured, relatively movable components capable of cooperating while in an expanded, operational position to form undercut interior features such as sets of continuously extending, uninterrupted interior threads, and capable of withdrawing thereafter to retracted, collapsed positions by a combination of pivotal and translational movements to disengage the newly molded interior features to enable the newly formed products to be ejected from the molds.

Mold cycle time is advantageously diminished because ejection from the mold of a newly formed product is not delayed until after core components have withdrawn from engaging newly formed interior features such as a set of continuously extending interior threads. Rather, ejection movement of a newly molded product is used to trigger and implement retraction or collapse of the pivotally and translatably movable components of the collapsible core, which concomitantly causes progressive disengagement of the relatively movable core components from the newly molded interior features of a newly molded product. The pivotally movable core components pivot, the translatably movable core components translate, and disengagement from interior threads by the relatively moving core components takes place progressively during ejection from the mold of a newly formed product.

BACKGROUND

Although injection molds are known that have core components capable of forming such interior features as sets of continuously extending interior threads, until now, withdrawal of interior core components from molds capable of forming interior threads has typically required several revolutions of relative rotation of the thread-forming components to disengage them from the newly formed interior threads. In essence, the technique principally used to withdraw the thread-forming core components has been to "unscrew" the thread-forming core components from the newly formed interior threads.

Requiring that mold core components be rotated (i.e., "unscrewed") for withdrawal greatly complicates and renders more costly the design of molds—calling for the molds to be provided with gears and other small and costly drive components that are subject to wear and breakage as well as a need for proper continuing lubrication, periodic service and replacement, and attendant down time.

Although injection molds having collapsible core components of various types are known for use in the molding of some types of undercut interior formations, until now, known types of collapsible core components for use in injection molds have not been at all well suited for use in the formation of extensive sets of continuously extending, uninterrupted interior threads.

Although collapsible core assemblies are known that employ a plurality of relatively movable components, no collapsible core assemblies suited for use in injection molds are known that employ separate sets of relatively movable core components that include one set of relatively movable core components that principally pivot between operational and retracted positions, and another set of relatively movable core components that principally translate between operational and retracted positions.

SUMMARY

In some forms of preferred practice, an injection mold has a collapsible core assembly that includes distinct sets of relatively movable components that move differently while traveling between expanded, operational positions, and retracted, core-collapsed positions. The relatively movable components cooperate while in the expanded, operational positions to define side-by-side segments of continuously extending features to be formed within the interiors of newly molded products, and, when in the retracted, core-collapsed positions, do not inhibit ejection of a newly formed product from the mold.

In some forms of preferred practice, a collapsible core assembly of an injection mold utilizes one set or array of relatively movable components that principally tip or pivot while moving between expanded, operational positions, and retracted, collapsed positions, and another set or array of relatively movable components that principally translate or slide between expanded, operational positions, and retracted, collapsed positions. When in the operational positions, each of the relatively movable components defines a separate segment of a set of continuously extending interior features that are to be formed within the interiors of newly molded products. When in the operational positions, each of the pivotable, tipable components is sandwiched between a different adjacent pair of the relatively movable components that slide or translate.

In some forms of preferred practice, an injection mold having a collapsible core includes a nest that pivotally mounts a first set or array of relatively movable core components, and that slidably mounts a second set or array of relatively movable core components. When in their operational positions, the core components reside snugly side by side to cooperatively define separate portions of a set of continuously extending features to be formed within the interiors of products being molded. Retraction or collapse of the relatively movable core components is triggered and progressively implemented by ejection movement from the mold of a newly formed product. As the core components retract, they progressively withdraw from engagement with the newly formed interior features, and thus facilitate ejection of the product from the mold.

In some forms of preferred practice, a collapsible core of an injection mold utilizes relatively movable components that extend snugly side by side to form individual segments of a continuously extending set of uninterrupted interior threads within a product being molded, whereafter the relatively movable components move substantially concurrently and in a unique manner to progressively withdraw from engagement with the interior threads.

In some forms of preferred practice, an injection mold has a collapsible core including a plurality of relatively movable components that engage side by side to cooperate in forming a set of continuously extending, uninterrupted interior threads. During withdrawal of the thread-forming components of the core from engagement with the newly formed threads, some of the core components primarily pivot, while others primarily translate as they move toward core-collapsed or retracted positions.

In some forms of preferred practice, relatively movable components of a collapsible core assembly reside side by side and cooperate when in operational positions to define separate segments of a set of continuously extending interior threads to be formed within a newly molded product, whereafter some of the relatively movable core components primarily pivot, while others primarily translate as they move toward their respective retracted or core-collapsed positions. Internal thread disengagement and retraction movements both take place progressively as ejection movement of a newly formed product proceeds.

In some forms of preferred practice, a set of substantially continuously extending interior threads is formed during injection molding of a product by using a collapsible core assembly that includes an array of substantially identical, tipable, pivotable components, and an array of substantially identical slidable, translatable components. When operationally positioned, each of the tipable, pivotable components is sandwiched between a different adjacent pair of the translatable, slidable components, and each of these relatively movable components forms a different segment of the set of interior threads. Once a new product has been molded, the tipable, pivotal components move to retracted locations separated from the retracted locations to which the translatable, slidable components move as the core assembly collapses causing progressive withdrawal of the thread-forming components from the newly formed set of interior threads.

In some forms of preferred practice, a collapsible core assembly includes relatively movable components that, after being operationally positioned side by side to cooperatively form a set of continuously extending interior threads, move toward retracted positions thereby progressively disengaging the newly formed threads. The retraction of the movable core components is triggered by ejection movement of a newly molded product. As the retracting core components pivot or slide toward their respective core-collapsed positions, they facilitate and may even assist with product ejection.

While features of the present invention are well suited to the formation of interior threads, it should be understood that features of the invention are also quite suitable for use in forming other undercut interior features of products being molded, such as O-ring and snap-ring grooves, slots, serrations, lubrication passageways, snap-together and other retention features, and the like.

BRIEF DESCRIPTION OF THE DRAWINGS

These and other features, and a fuller understanding of the present invention may be had by referring to the following description and claims, taken in conjunction with the accompanying drawings, wherein:

DESCRIPTION OF PREFERRED EMBODIMENTS

Figure 1:
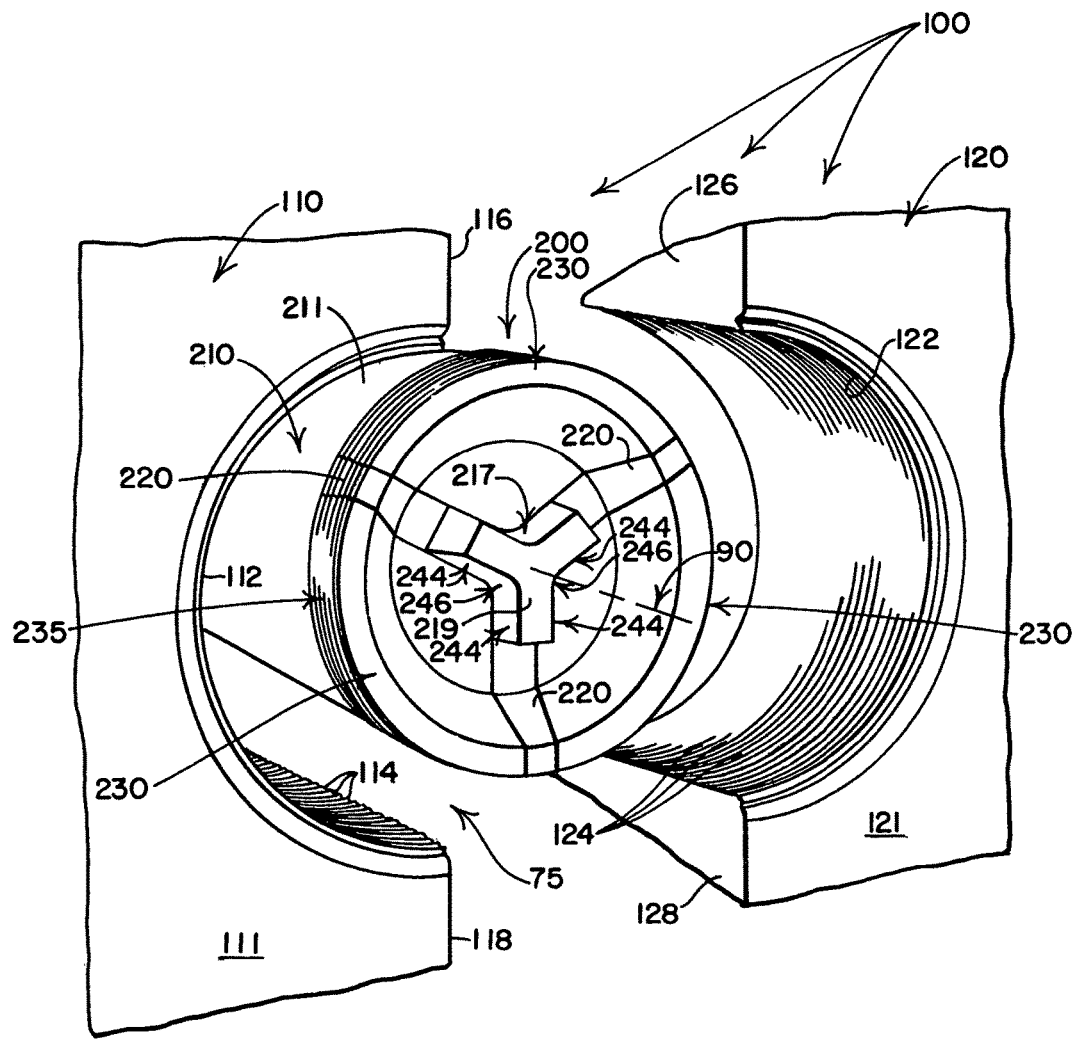
FIG. 1 is a perspective view of selected portions of an injection mold for forming, one at a time, products from molten thermoplastic material, with the depicted mold portions including relatively movable, spaced-apart, left and right components that each defines a substantially semicircular recess configured to encircle one half of a cavity of the mold to form exterior product features including a set of continuously extending exterior threads, with the depicted mold portions further including a collapsible core assembly situated between the semi-circular recesses and extending along an imaginary center axis or centerline of the mold, and including relatively movable components shown in operational positions to form such undercut interior product features as is exemplified here by a set of continuously extending interior threads.

Referring to FIG. 1, the numeral 100 is used to designate not only such selected components, elements and portions of a mold as are depicted, but also is used to refer to the mold itself, which is intended for use with conventional injection molding equipment (not shown) to mold products when molten thermoplastic material is injected under pressure into a cavity 75 of the mold 100. The depicted components, elements or portions of the mold 100 include opposed, relatively movable, left and right side components that are designated by the numerals 110 and 120, respectively—and also includes a collapsible core assembly 200 that resides between the relatively movable left and right side components 110, 120.

Although the mold 100 is intended primarily for use with well known forms of injection molding apparatus (not shown) to form products via the injection molding of thermoplastic materials, those skilled in the art will readily understand and appreciate that features and components of the present invention can undoubtedly be used in other types of molding processes, and with other kinds of molding apparatus presently known or not yet reduced to practice. Accordingly, nothing in this document should be interpreted as limiting what is disclosed or claimed herein as being usable only with known injection molding apparatus, or as being usable only in the formation of products by techniques of injection molding.

In this document, such words as "left," "right," "top," "bottom," "upper," "lower," "upward," "downward," and the like are used merely as a matter of convenience in explaining how various components and features are arranged or relatively positioned in the accompanying drawings, or move to or from such positions as are shown in the accompanying drawings. The use of these and other orientation indicating words does not imply or require that components or features should be positioned in any particular manner to achieve proper operation of the mold 100 or any of its relatively movable components.

Figure 2:
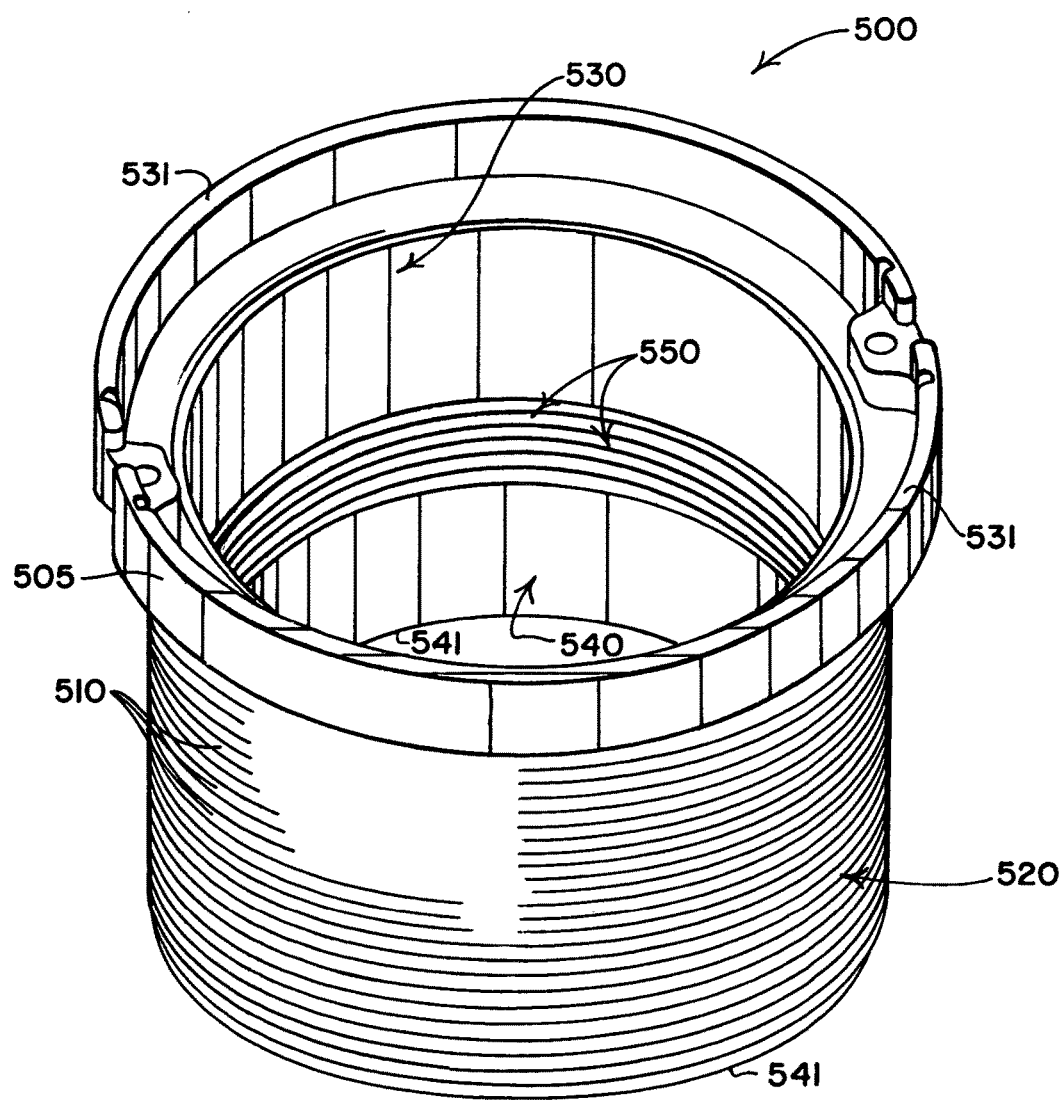
FIG. 2 is a perspective view of an example of a tubular product that can be formed using an injection mold having portions of the sort shown in FIG. 1.

The opposed left and right side components 110, 120 shown in FIG. 1 are sizeable machined members preferably formed from stainless steel that define left and right semi-circular or C-shaped recesses 112, 122, respectively, which open toward each other. Although the left and right recesses 112, 122 can be modified to mold a wide variety differently configured surface formations on the exteriors of a wide variety of products, the left and right semi-circular or C-shaped recesses 112, 122 that are shown in FIG. 1 are specifically configured to cooperate in the formation of left and right portions of a set of continuously extending, uninterrupted male threads 510 on a generally cylindrical exterior surface 520 of a molded product such as an example product 500 that is shown in FIG. 2.

Figure 11:
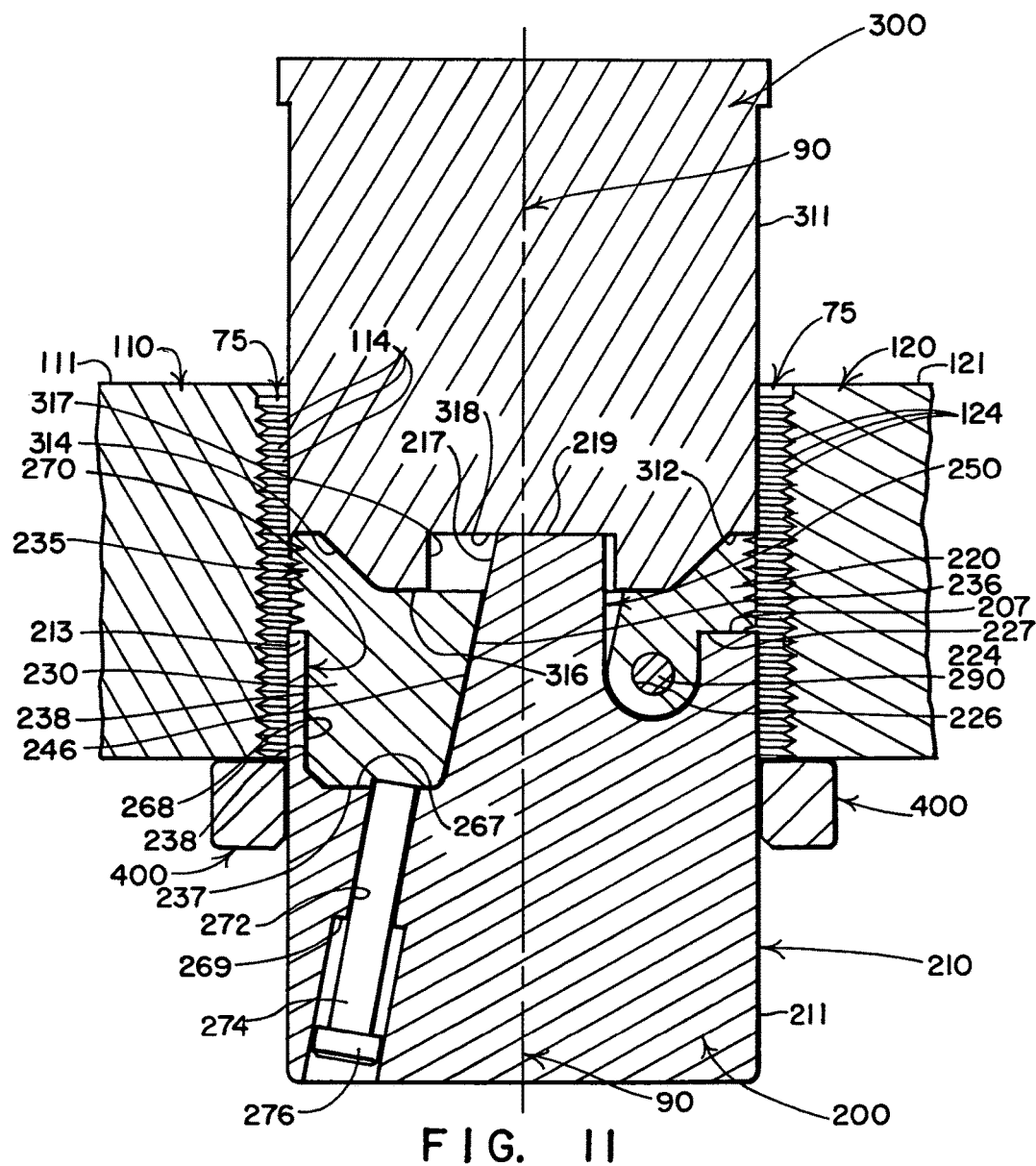
FIG. 11 is a cross-sectional view showing selected components of the mold and mold core in operational positions (defining all but one annular end region of a mold cavity in which products such as the tubular molded product shown in FIG. 2 can be formed), with the relatively movable left and right side members shown in FIG. 1 moved into engagement thereby causing the sizable semi-circular recesses of the left and right side members to perimetrically embrace the mold cavity, with the core components shown in FIG. 3 moved to their operational positions, with the end cap component shown in FIG. 10 depending into engagement with the core components of FIG. 3, and with an ejection ring that can slide along the cylindrical exterior of the nest component of FIG. 4 positioned to close a lower annular portion of the mold cavity that encircles the nest of the mold.

When the relatively movable left and right side components 110, 120 of the mold 100 are closed toward each other to bring the upper and lower surfaces 116, 118, respectively, of the left side mold member 110 into firm engagement with the upper and lower surfaces 126, 128, respectively, of the right side mold member 120, the semi-circular recesses 112, 122 cooperate (as shown in FIG. 11) to define a generally annular-shaped mold cavity 75 that encircles the collapsible core assembly 200 at a small, substantially uniform distance spaced therefrom.

As those skilled in the art will readily appreciate and understand, the single depicted mold cavity 75 is utilized as part of a heavily constructed "container" within which products (such as the example product 500 shown in FIG. 2) can be molded, one at a time, by injecting sequential charges of molten thermoplastic material, under pressure, into the mold cavity 75 after various relatively movable components of the mold 100 and the collapsible core assembly 200 have been moved to such operational positions as are shown in the cross-sectional view of FIG. 11.

Figure 12:
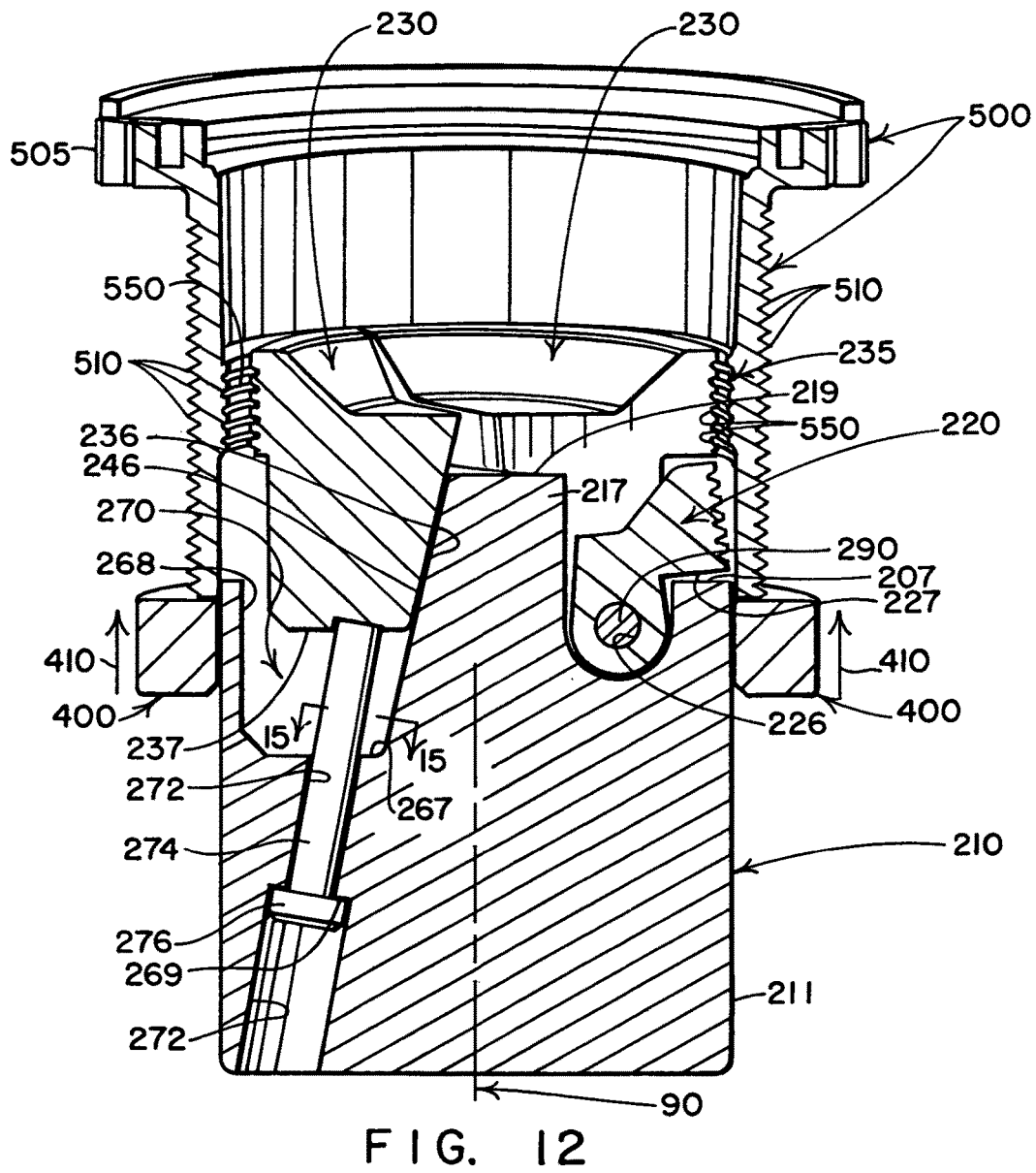
FIG. 12 is a cross-sectional view similar to FIG. 11, but which is somewhat schematic in that certain of the depicted components may not move concurrently, and may not move to precisely the positions that are depicted, with the view 1) showing the ejector ring raised along the cylindrical exterior of the nest of the mold's core from the position shown in FIG. 11, 2) showing a newly molded product such as is depicted in FIG. 2 being ejected by upward movement of the ejector ring, 3) showing a pivotal flipper of the collapsible core pivoted or tipped to its fully retracted position, and 4) showing two of the lifters of the collapsible core slidably raised or translated to their fully retracted positions.
Figure 13:
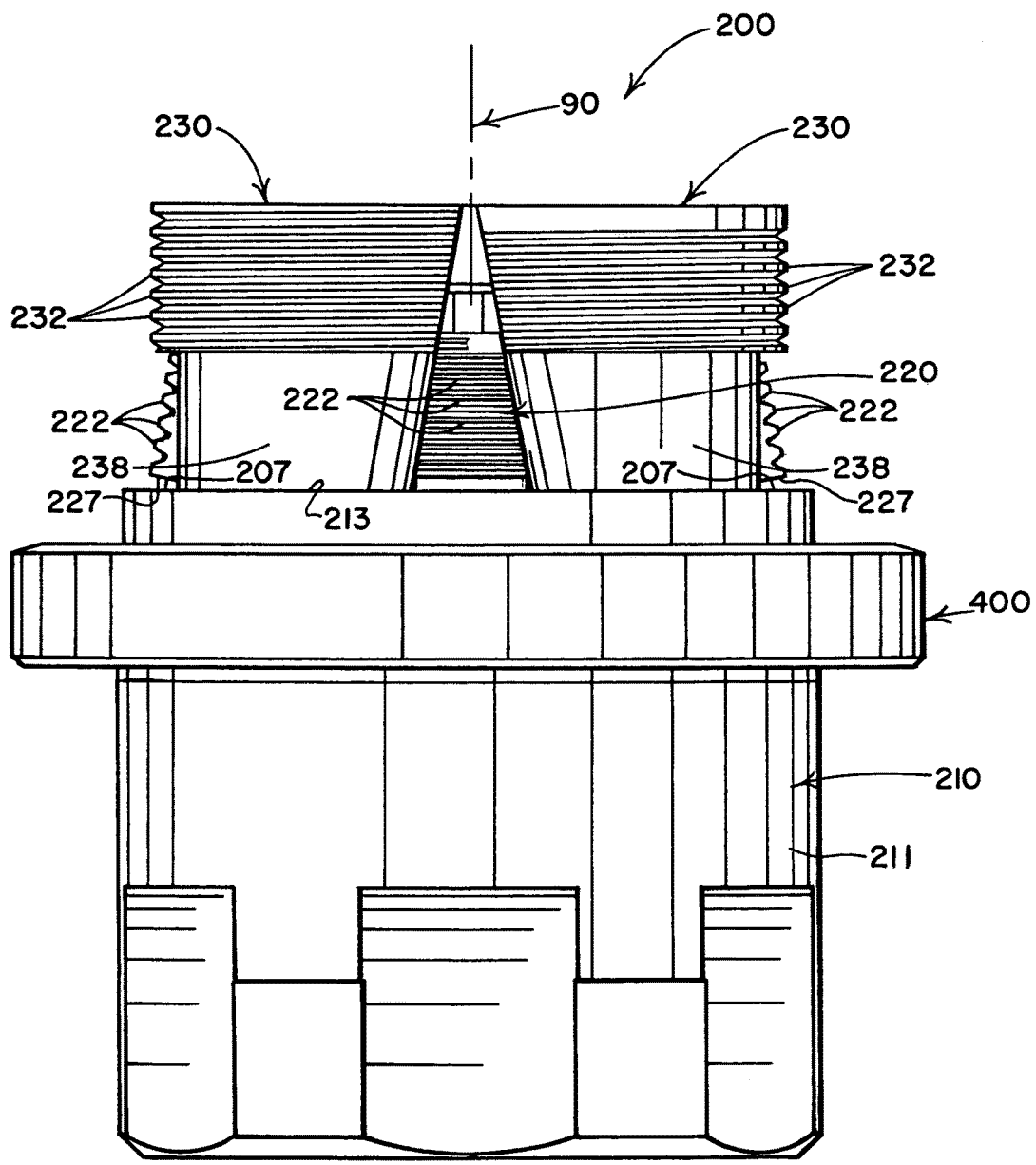
FIG. 13 is a side elevational view on an enlarged scale showing the nest encircled by the ejection ring, and showing the relatively movable flippers and lifters of the mold in their respective core-collapsed or retracted positions that are shown somewhat schematically in FIG. 12.

As those who are skilled in the art will also readily appreciate and understand, such mold components, elements or portions as are depicted in FIG. 1 do not constitute an entirely complete injection mold, nor is the mold cavity 75 fully defined by the depicted components, elements or portions. Missing from FIG. 1 are such components as a mold end cap 300 (that is shown by itself in FIG. 10, and in cross-section in FIG. 11 engaging the mold components, elements and portions shown in FIG. 1). Also missing from FIG. 1 is an ejection ring 400 that is shown in FIGS. 11-13, which encircles a nest 210 of the mold 100 and serves (as shown in FIG. 11) to close an otherwise open annular end region of the mold cavity 75.

Missing from all of the accompanying drawings are such mold components as may be bolted onto or otherwise securely fastened to the front surfaces 111, 121 (shown in FIGS. 1 and 11) of the left and right side mold components 110, 120, respectively, to mold in conventional ways such product features as the circumferentially extending flange 505 (shown in FIG. 2) which is an integral part of the example molded product 500 shown in FIG. 2.

Thus, as those skilled in the art of injection mold formation will readily appreciate, it is possible to use such mold components, elements or portions as are shown in FIG. 1 (in combination with various other conventionally configured mold components, elements and portions, some of which are not shown in the accompanying drawings) to create a wide variety of generally tubular products (an example product 500 being shown in FIG. 2) which may have a variety of differently configured end region configurations such as the sizeable encircling flange 505 formation shown in FIG. 2. Stated more simply, the product 500 shown in FIG. 2 is merely an example of many generally tubular products that can be formed using the mold components, elements or portions shown in FIG. 1.

A principal exterior feature of the example product 500 is the extensive set of continuously extending male threads 510 that helically encircle an otherwise substantially cylindrical exterior surface 520. Principal interior features of the product 500 include gently tapered upper and lower surfaces 530, 540, respectively, that both constrict slightly in diameter as these essentially truncated conical surfaces 530, 540 approach the centrally located, continuously extending set of uninterrupted interior threads 550. Opposed upper and lower end surfaces of the example product 500 are designated in FIG. 2 by the numerals 531, 541, respectively.

Just as the relatively movable left and right side components 110, 120 (shown in FIGS. 1 and 11) of the mold 100 are preferably formed from stainless steel, so too, are all other metallic components of the injection mold 100, including such components as cooperate to form all portions of the collapsible core assembly 200. This is because at least some of the thermoplastic materials that may be injected under pressure into the mold cavity 75 to form such products as the example product 500 shown in FIG. 2 may be (and often are) corrosive in nature, and could, therefore, subject components of the mold 100 and its collapsible core 200 to deterioration if such components were to be fabricated from ordinary carbon steel.

The use of stainless steel that is heat treated and hardened to a Rockwell C scale hardness in the range of about RC 46 to about RC 50 makes components of the mold 100 durable and long lasting, and permits the mold 100 to be used to form a variety of products that are used, for example, in common plumbing applications. If the mold 100 were not being used to form products from such corrosive thermoplastic materials as polyvinyl chloride, components of the mold 100 could be fabricated from carbon steel or less expensive forms of stainless steel.

Figure 3:
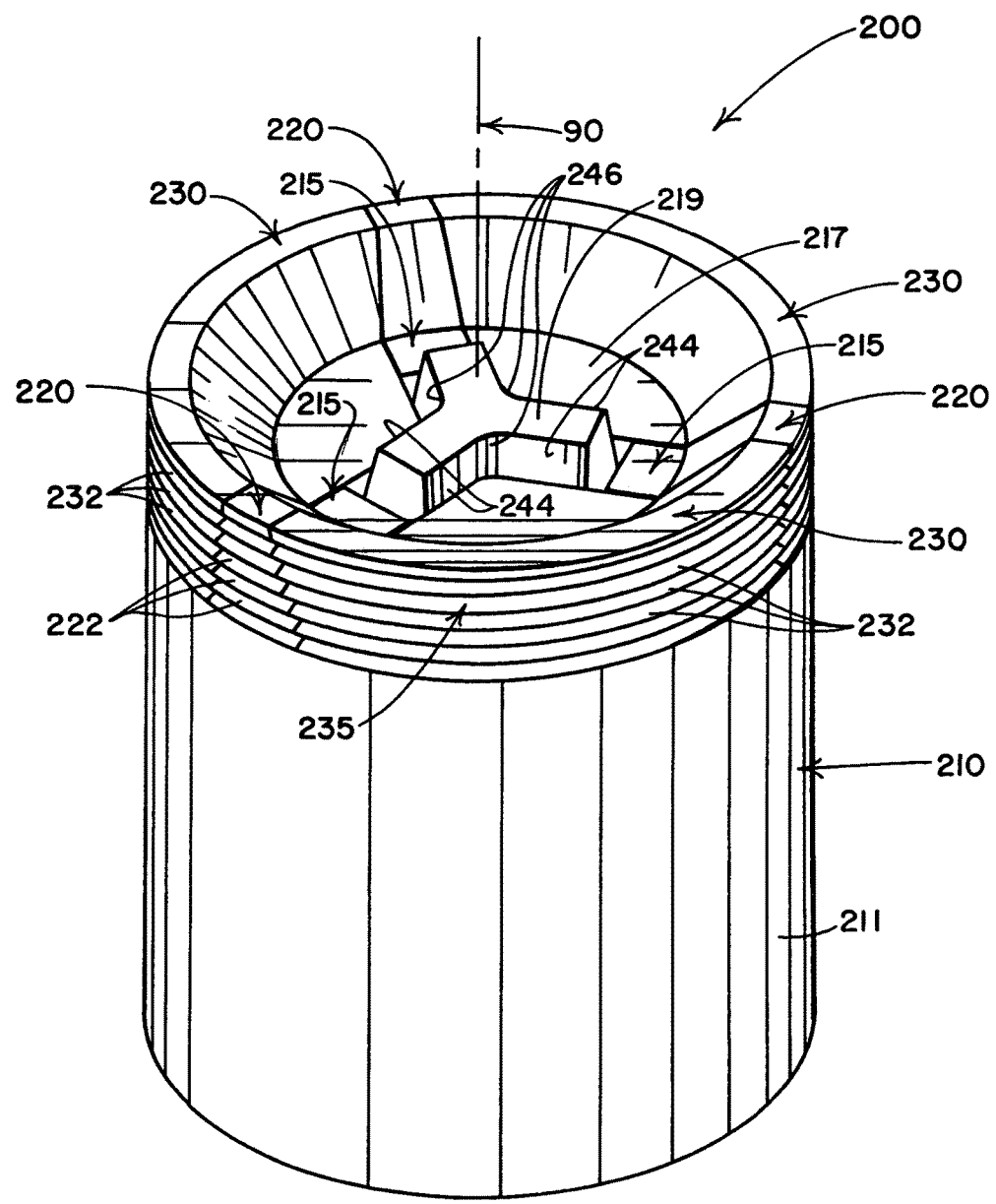
FIG. 3 is a perspective view on an enlarged scale of selected portions of the collapsible core assembly showing relatively movable components of the core in the operational position.
Figure 4:
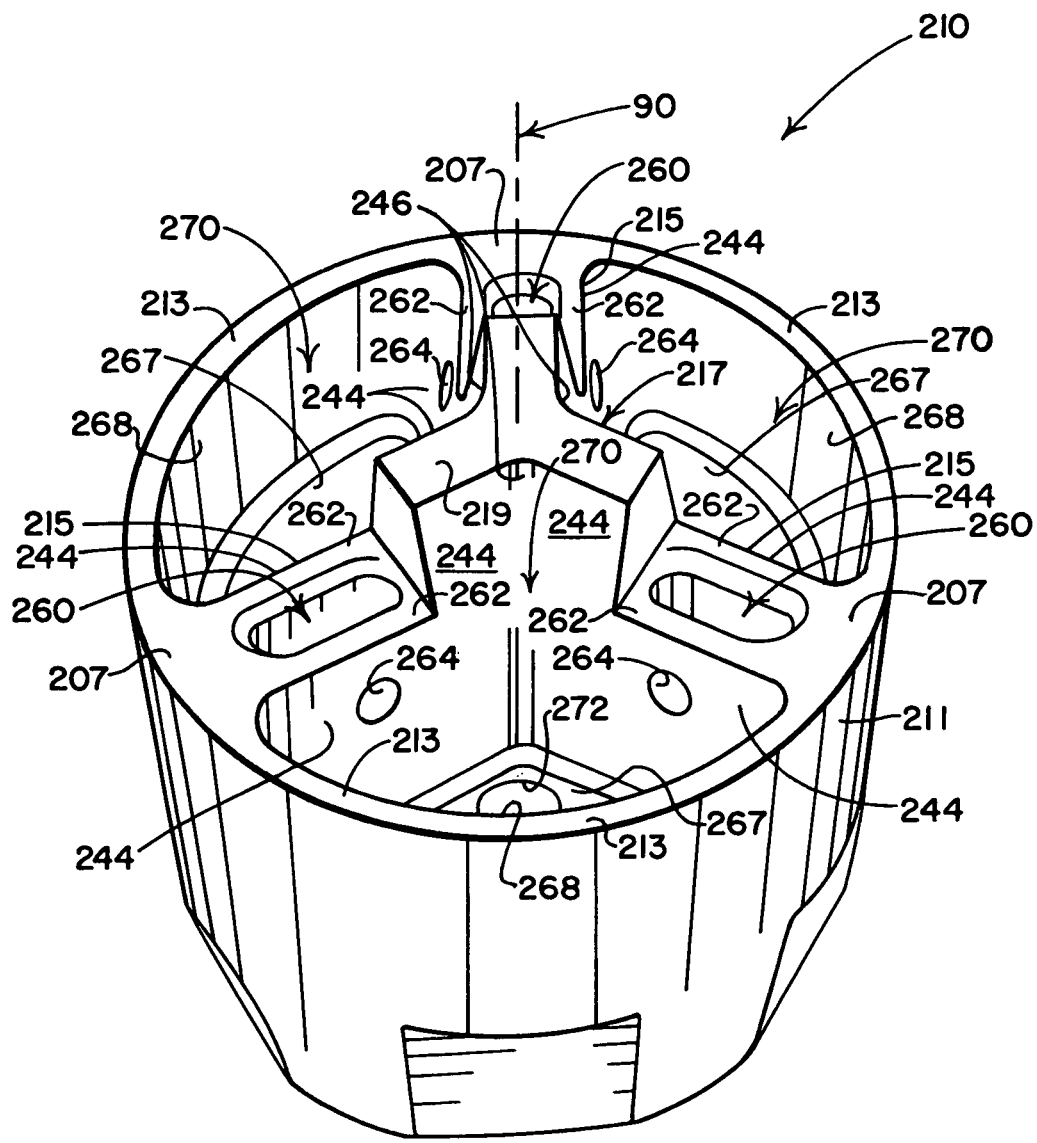
FIG. 4 is a perspective view of a nest or nest component of the collapsible core assembly shown in FIGS. 1 and 3.

A major component of the core assembly 200 is a generally cylindrical nest component or nest 210 which is shown by itself in FIG. 4. As will be more fully explained, and as can be seen in FIG. 3, the nest 210 partially houses and movably mounts six relatively movable components that include three substantially identical so-called "flippers" 220, and three substantially identical so-called "lifters" 230. The flippers 220 and lifters 230 define thread formations 222, 232, respectively.

The flippers 220 can be said to be "substantially identical" one with another because, with only the exception that the thread formations 222 provided on the flippers 220 differ one from another (as can best be seen by looking carefully at FIGS. 6 and 7), the flippers 220 are indeed identical one with another. Likewise, the lifters 230 can be said to be "substantially identical" because, with only the exception that the thread formations 232 provided on the lifters 230 differ one from another (as can best be seen looking carefully at FIGS. 8 and 9), the lifters 230 are indeed identical one with another.

Although the flippers 220 and lifters 230 are provided with thread formations 222, 232, respectively, which are configured to cooperatively define a set of continuously extending threads 235 (shown in FIGS. 1 and 3) that are used to form interior threads 550 (shown in FIG. 2) in the example product 500 (shown in FIG. 2), those skilled in the art will recognize and appreciate that the flippers 220 and lifters 230 can instead be outfitted with a wide range of other formations that are suitably configured to create other undercut interior formations on newly molded products, such as O-ring and snap-ring grooves, slots, serrations, lubrication passageways, snap-together and other retention features, and the like.

Referring to FIG. 4, the nest 210 has a generally cylindrical exterior surface 211 that encircles the imaginary center axis or centerline 90. Defining spaced, arcuately extending portions of the cylindrical exterior surface 211 are three relatively thin, arcuately extending outer wall portions 213 of equal length. Three identically configured, radially extending walls 215 have end regions that extend radially outwardly to join the cylindrical exterior surface 211, with these outer end regions defining upwardly facing stop surfaces 207 that are labeled in FIGS. 4, 11 and 12. The walls 215 extend radially inwardly and join near a center region of the nest 210 to define an upstanding Y-shaped formation 217. The Y-shaped formation 217 has a flat upper end surface 219 that can be seen in FIGS. 1, 3, 4, 11 and 12.

Referring still to FIG. 4, each of the radially extending walls 215 of the nest 210 is provided with a narrow, elongate, radially extending, slot-like recess 260. The slot-like recesses 260 of the nest 210 are identically configured, and are equally angularly spaced and arrayed about the imaginary center axis or centerline 90. The recesses 260 are bordered on opposite sides by pairs of relatively thin sidewall segments 262 of the associated radially extending walls 215. Aligned holes 264 are formed through the sidewall segments 262 of the radially extending walls 215.

Referring still to FIG. 4, the nest 210 also is provided with three identically configured depending pockets 270 that are of generally pie-slice shape. The pockets 270 are equally angularly spaced and arrayed about the center axis or centerline 90. Each of the identical pockets 270 has a pair of inclined rear walls 244 that are joined by a rounded transitional surface 246. A curved front surface 268 and a relatively flat bottom surface 267 cooperate to complete each of the identical pockets 270.

Three identical inclined passageways 272 (one of which is shown in cross-section in FIGS. 10 and 11), are formed in lower portions of the nest 210. Each of the passageways is located beneath a separate one of the identical pockets, and each opens into a separate one of the pockets 270 through its associated bottom surface 267. An upper end region of one of the identical passageways 272 can be seen in FIG. 4. The inclination of each of the passageways 272 causes it to substantially parallel an associated one of the gently curved transitional surfaces 246 that join the two similarly inclined surfaces 244 at the rear of the pockets 270 into which the passageway opens.

Figure 5:
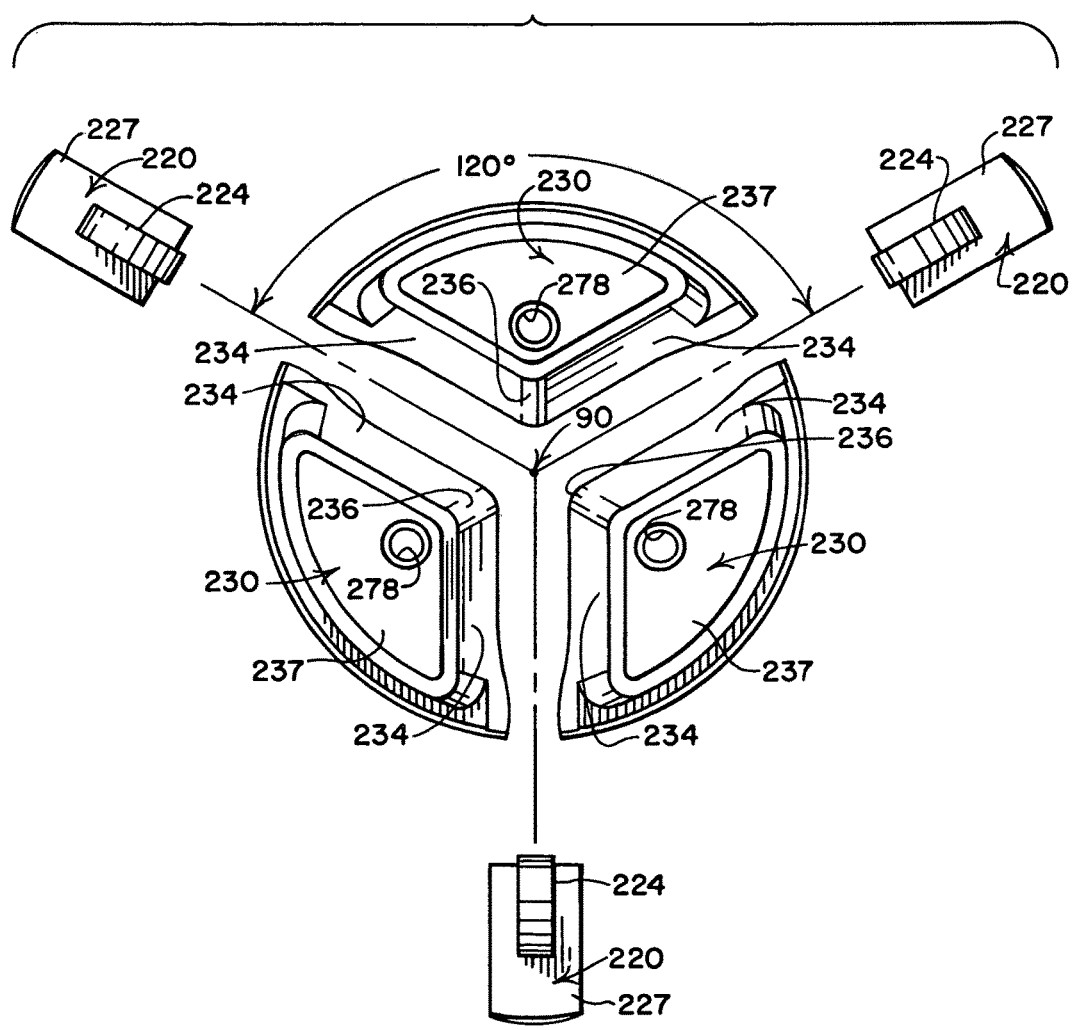
FIG. 5 is an exploded, somewhat schematic, bottom view showing six relatively movable components of the collapsible core, with the view depicting both a set of three relatively small, nearly identical flipper components or "flippers," and a set of three relatively larger, nearly identical lifter components or "lifters," and with the view schematically indicating how each of the flippers can be sandwiched between a different adjacent pair of the lifters, and how each of the lifters can be sandwiched between a different adjacent pair of the flippers.

Three identical cap screws 274 (one of which is shown in FIGS. 11 and 12) extend loosely through individual ones of the passageways 272 and into a separate associated one of the pockets 270. The cap screws 274 are each threaded into a downwardly opening threaded hole 278 (FIG. 5) formed in an associated one of the lifters 230. Although, as will be explained, the cap screws 274 extending through the passageways 272 serve to restrict and to guide the movements of associated ones of the lifters 230, the passageways 272 through which the cap screws 274 extend loosely receive the cap screws 274. As is explained later herein in conjunction with FIG. 15, the passageways 272 are preferably enlarged slightly as may be needed to permit more than mere linear translatory movements of the lifters 230—as the lifters 230 move into and out of their associated pockets 270 during movement of the lifters 230 between the operational positions of the lifters 230 shown in FIGS. 1, 3 and 11, and the retracted positions of the lifters 230 shown in FIGS. 12-14.

Figure 14:
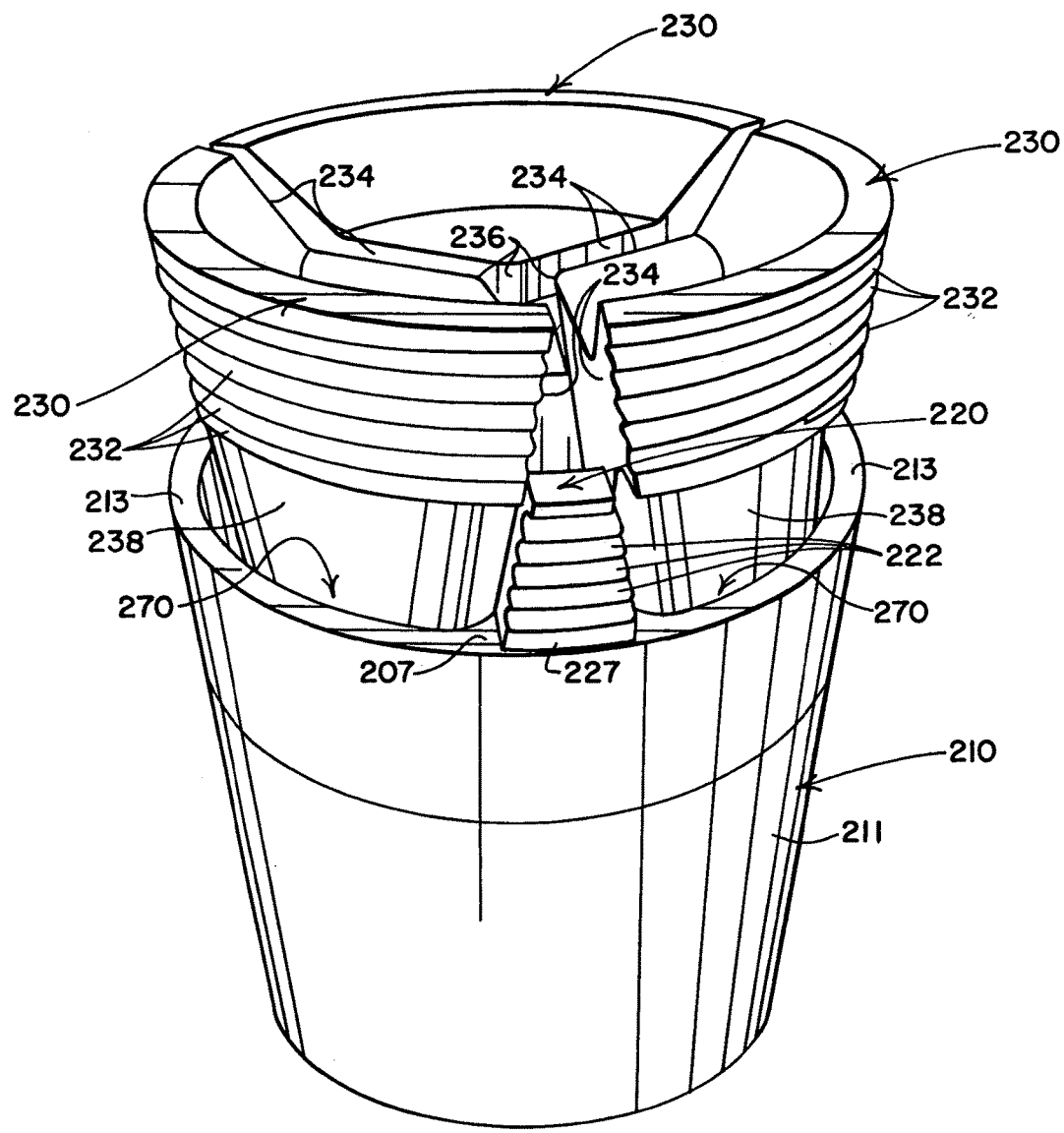
FIG. 14 is a perspective view that shows one of the flippers pivoted or tipped to its retracted position, and shows the three lifters translated upwardly to their retracted positions raised partially out of pockets defined by the nest of the core of the mold; and, FIG. 15 is a top view on an enlarged scale of a portion of the nest of FIG. 4 as seen from a plane indicated by a line 15-15 in FIG. 12, with the view showing a top end region of one of three identical passageways that opens into one of three identical pockets of the nest, and with the view schematically illustrating alternative approaches than may be used to enlarge the depicted passageway to achieve a desirable type of lifter movement intended to avoid collisions of the lifters and flippers.

Each of the cap screws 274 has an enlarged head 276 that can engage a shoulder 269 located within the associated passageway 272 where the passageway 272 changes diameter. The heads 276 of the cap screws 274 abut the associated shoulders 269 when the associated lifters 230 are moved to their retracted, core-collapsed position, as is shown by the lifter 230 shown in FIG. 12. The permitted extent to which the relatively lengthy cap screws 274 can move back and forth in the passageways 272 defines the permitted range of travel of the lifters 230 when the lifters move between the extended, operational positions that are shown in FIGS. 1, 3 and 11, and the retracted, core-collapsed positions that are shown in FIGS. 12-14.

Referring to the assembly view of FIG. 3, the six relatively movable components of the core assembly 200 (namely the three flippers 220 and the three lifters 230 extend snugly side by side when operationally positioned. A significant feature of the flippers 220 and lifters 230 is that their respective differently configured thread formations 222, 232 (which also extend snugly side-by-side when the flippers 220 and the lifters 230, respectively, are in their operational positions as shown in FIGS. 1 and 3) cooperate to define a single set of continuously extending, uninterrupted male threads 235—threads 235 that serve to form the single set of continuously extending female interior threads 550 on the interior of a product (such as the example product 500 shown in FIG. 2) when molten thermoplastic material is forced under pressure into the mold cavity 75 and into intimate engagement with the set of male threads 235 defined by the collapsible core assembly 200.

Although the use of a set of exactly three flippers 220 and a set of exactly three lifters 230 is preferred, it is possible to utilize other equal numbers of substantially identically configured flippers 220 and substantially identically configured lifters 230 in molds 100 that embody features of the present invention. However, as the number of flippers and lifters employed by a mold increases, so do the machining costs that are associated with the manufacture of the resulting collapsible core assemblies 200 of the molds 100. Likewise, while the depicted mold 100 is shown as having only a single cavity 75 and a companion collapsible core assembly 200 (for molding products one at a time, molds that have a larger number of cavities that may be arranged side by side (with each having a companion collapsible core assembly 200) can be provided to concurrently form two or more of products such as the example product 500 shown in FIG. 2; however, such plural-cavity molds (not shown) will have higher attendant material and machining costs.

Figure 6:
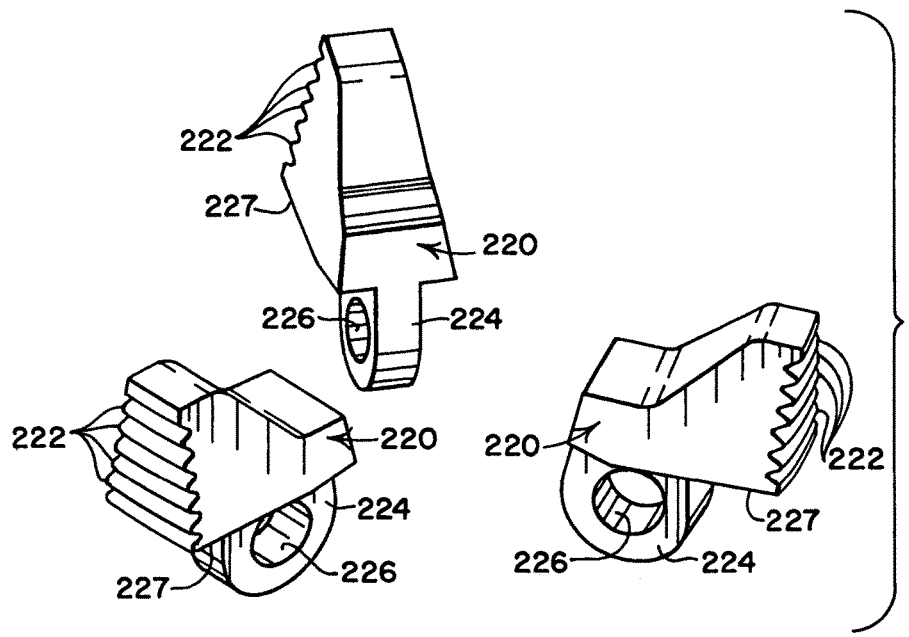
FIG. 6 is a perspective view showing the three flippers.
Figure 7:
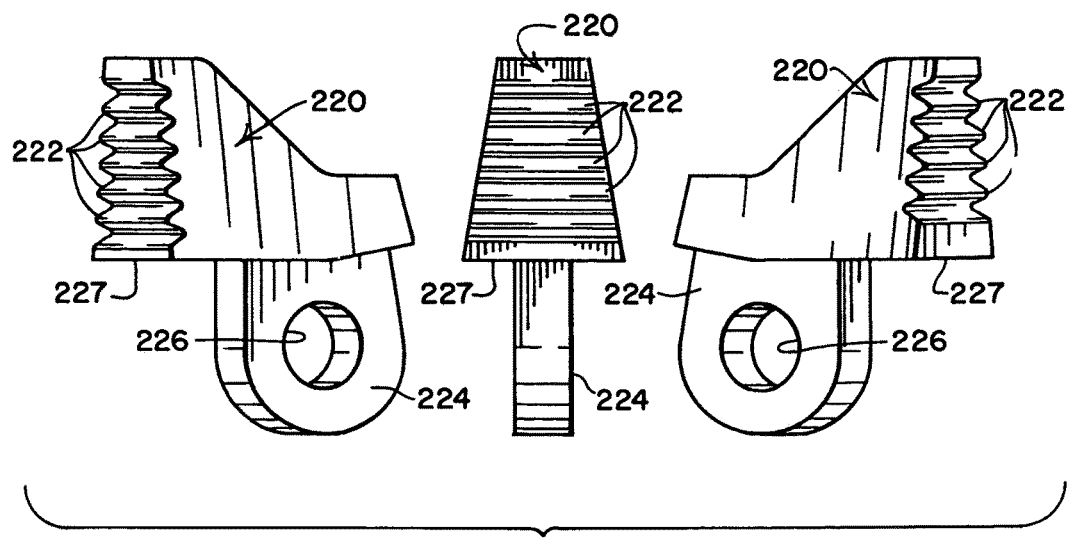
FIG. 7 is another perspective view showing the three flippers.

Referring to FIGS. 6 and 7, each of the substantially identical flippers 220 has a relatively narrow bottom extension 224. Each of the bottom extensions 224 depends into a different one of the slot-like recesses 260 of the nest 210. To aid in pivotally connecting the flippers 220 to the nest 210, identical holes 226 extend through each of the depending extensions 224 of the flippers 220. Three substantially identical, relatively stubby, generally cylindrical pivot pins 290 (one of which is shown in cross-section in each of FIGS. 11 and 12) extend through different sets of the aligned holes 226, 264 formed through each of the flippers 220 and an associated pair of the sidewall segments 262.

As can be seen by comparing the extended, operational positions of the flippers 220 shown in FIGS. 1, 3 and 11 to the retracted or collapsed positions of the flippers 220 shown in FIGS. 12-14, the pivotal connections of the flippers 220 to the nest 210 is intended to permit the flippers 220 to execute only a relatively limited range of travel—i.e., to pivot or essentially to "tip" only a limited amount while moving between the operational and retracted positions of the flippers 220.

When the flippers 220 are tipped radially outwardly to their extended, operational positions (as is exemplified by the one depicted flipper 200 shown in FIG. 11), the substantially identically configured flippers 220 cause their downwardly-facing stop surfaces 227 to each engage an associated one of the three upwardly facing stop surfaces 207 that are defined by the nest 210. However, when the flippers 220 are tipped radially inwardly to their retracted positions (as is exemplified by the one depicted flipper 200 shown in FIG. 12), the stop surfaces 207, 227 disengage.

As can be noted by viewing the accompanying drawings, when in their retracted or core-collapsed positions, the flippers 220 are more closely located to the center axis or centerline 90 than is the situation when the flippers 220 are in their operational or extended positions. Likewise, when the lifters 230 are in their retracted or core-collapsed positions, the lifters 230 are more closely located to the center axis or centerline 90 than is the situation when the lifters 230 are in their operational or extended positions. Stated in another way, when the flippers 220 and the lifters 230 are in their retracted or core-collapsed positions shown in FIGS. 12-14, the flippers 220 and lifters 230 are grouped more closely about the center axis or centerline 90 than when the flippers 220 and lifters 230 are in their extended or operational positions shown in FIGS. 1, 3 and 11.

As can also be noted by viewing the accompanying drawings, when the flippers 220 and the lifters 230 have moved from the operational positions of FIGS. 1, 3 and 11 to the retracted or core-collapsed positions shown in FIGS. 12-14, the lifters 230 are no longer physically separated by the flippers 220. Moreover, when in their respective retracted or core-collapsed positions, the flippers 220 and lifters 230 cause their respective thread formations 222, 232 to fully disengage from such interior threads 550 as may have been formed within a newly molded product 500 that (as can be seen in the product-partially-ejected view of FIG. 12) may encircle the flippers 220 and lifters 230 until such time as the product 500 is ejected from the mold 100.

Figure 8:
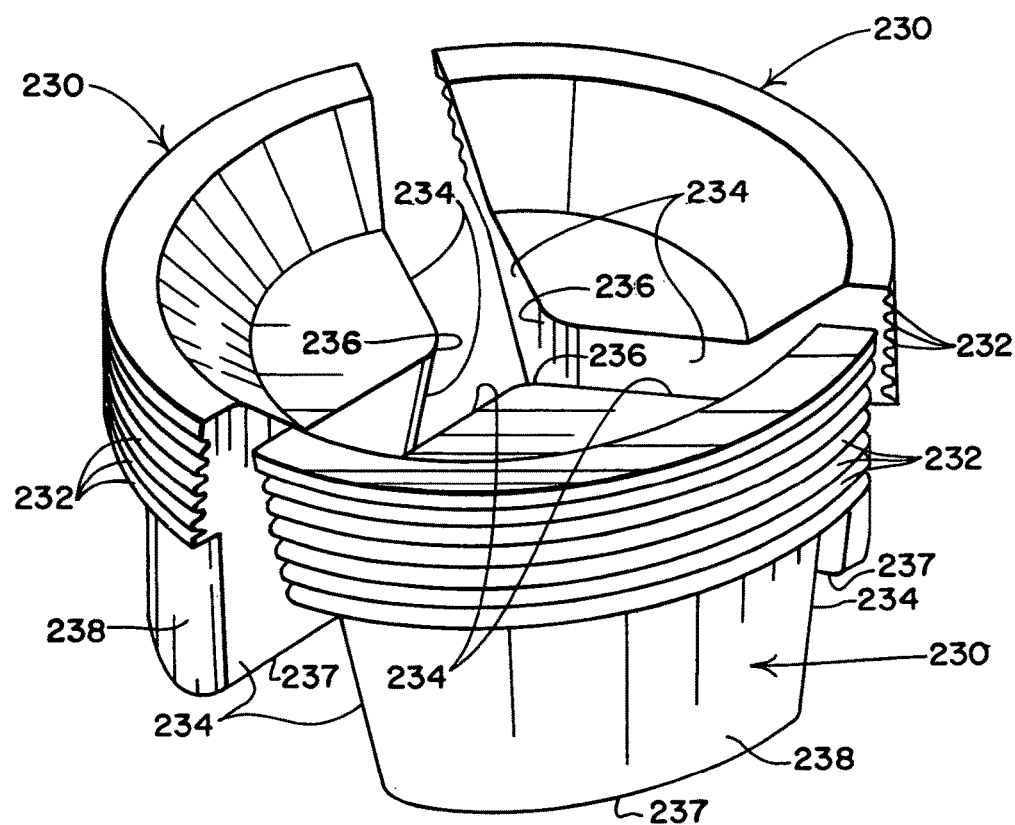
FIG. 8 is a perspective view showing the three lifters.
Figure 9:
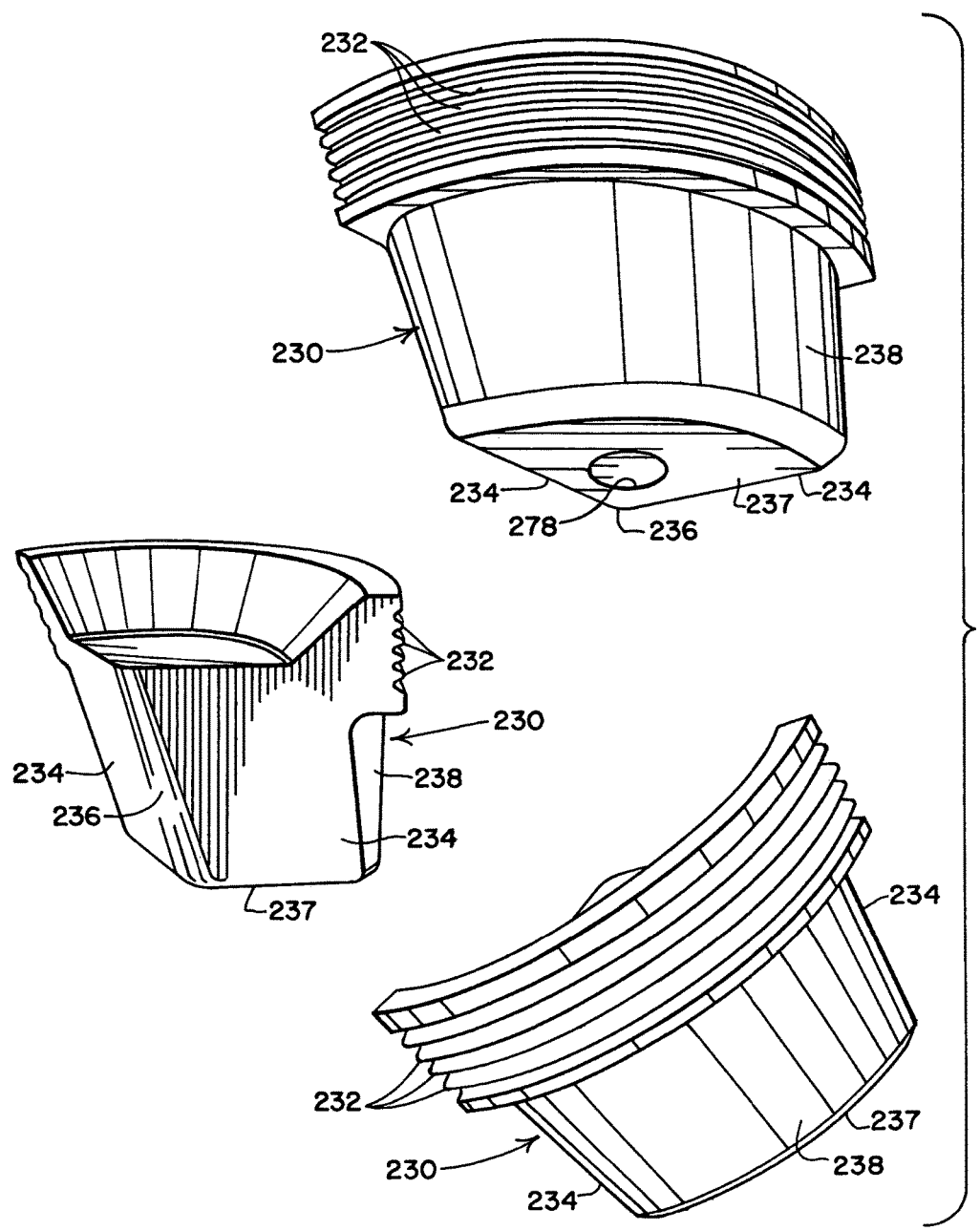
FIG. 9 is another perspective view showing the three lifters.

Referring to FIGS. 8 and 9, the lifters 230 have rear portions that are defined by two inclined surfaces 234 that are joined by short, gently curved, transitional surfaces 236. The lifters 230 also have arcuately curved front surfaces 238, and bottom surfaces 237. The inclination of the rear surfaces 234 of the lifters 230 substantially matches the inclination of rear surfaces 244 of the pockets 270 of the nest 210 into which the lifters 230 depend. Similarly, the inclination of the gently curved transitional surfaces 236 (FIGS. 8 and 9) of the lifters 230 substantially matches the inclination of the gently curved transitional surfaces 246 (FIG. 4) of the pockets 270—which inclination correspondence also can be seen in FIGS. 11 and 12 where one of each of the transitional surfaces 236, 246 is shown.

The correspondingly inclined surfaces 234, 244 and 236, 246 are engaged when the lifters 230 are in their operational positions (shown in FIGS. 1, 3 and 11) which causes the lifters 230 to be seated in their respective pockets 270 of the nest 210, and when the lifters 230 have moved upwardly to the retracted positions (shown in FIGS. 12-14) which causes the lifters 230 to extend upwardly out of their respective pockets 270. However, as will be explained shortly, the inclined surfaces 234, 236 of the lifters 230, and the inclined surfaces 244, 246 of the nest 210 do not engage during the entire time that the lifters 230 are moving between the operational and retracted positions.

A feature of the invention that derives from the different manner in which the flippers 220 and lifters 230 are movably connected to the nest 210 is that the flippers 220 are essentially limited to relatively small tipping movements (as the flippers 220 move toward their retracted positions and progressively disengage the interior threads 550 of a newly formed product 500), whereas the lifters 230 are permitted to translate in what amounts to a substantially (but not entirely) linear manner through significantly longer ranges of travel (as the lifters 230 move from their operational positions to their retracted positions, and progressively disengage during this travel from the interior threads 550.

In their side-by-side operational positions as shown in FIGS. 1, 3 and 11, the flippers 220 are interposed between and cause significant separation of the lifters 230—which is required for the thread formations 222, 232 of the flippers 220 and lifters 230, respectively, to form the interior threads 550. However, when in the very differently located retracted positions shown in FIGS. 12-14, the flippers 220 are not interposed between and do not physically separate the lifters 230, and cause the thread formations 222, 232 to retract or withdraw radially inwardly away from the newly formed interior threads 550.

Because the flippers 220 need not precisely pivot about the axes of the pivot pins 290 as the flippers 220 move from the operational positions to the retracted positions, and because the lifters 230 need not precisely linearly translate as the lifters 230 move from the operational positions to the retracted positions, it frequently is desirable to slightly enlarge both the holes 226 through which the pivot pins 290 extend, and the inclined passageways 272 through which the cap screws 274 extend—so that the flippers 220 can deviate a few thousandths of an inch from moving exclusively in a purely pivotal manner about the axes of the pivot pins 290, and so that the lifters 230 can deviate a few thousandths of an inch from moving in a purely linear translatory manner in directions defined by the inclination of the passageways 272 through which the cap screws 274 extend which restrict and guide retraction movements of the lifters 230. By this arrangement, collision and/or possible jamming of the flippers 220 and the lifters 230 during retraction movements toward core-collapsed positions can be minimized or prevented, and smoother movements of the flippers 220 and lifters 230 toward their respective retracted positions are permitted to take place.

Furthermore, as the configurations of the nest 210, the flippers 220, and/or the lifters 230 are modified to enable the collapsible core assembly 200 to mold larger or smaller diameter sets of the interior threads 550 (or other types of interior formations), and as the number of flippers 220 and lifters 230 is modified to accommodate the molding of differently sized sets of the interior threads 550 (or the like), the amounts of material removed to enlarge the flipper holes 226 and/or the cap screw passageways 272 that govern the retraction movements of the flippers 220 and the lifters 230 may need to be modified to minimize collision and/or jamming of the flippers 220 and the lifters 230.

Figure 15:
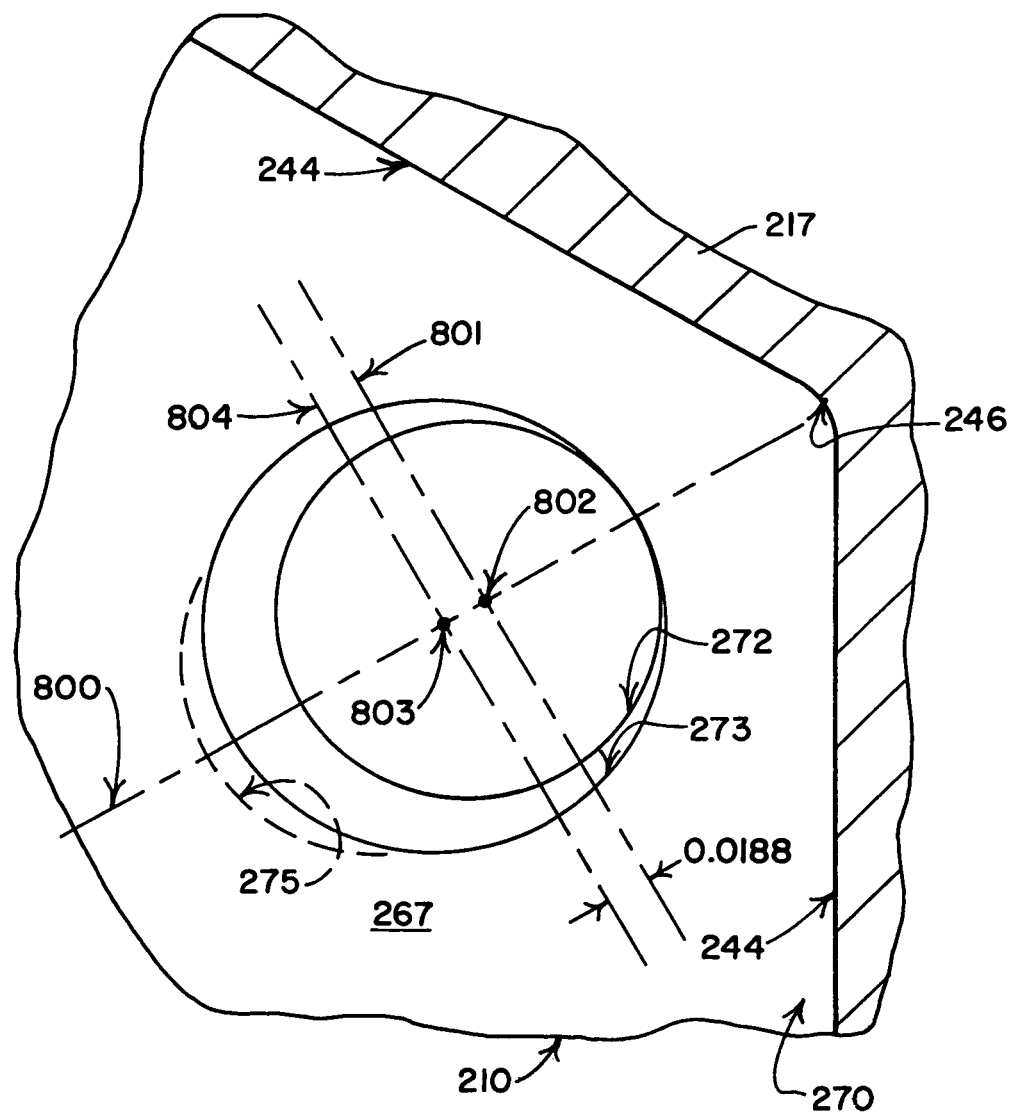

Discussed later herein in conjunction with FIG. 15 is the topic of how the passageways 272 are preferably enlarged or otherwise configured to loosely receive the cap screws 274. What can correctly be observed at this point in the description is that the manner in which both the holes 226 and the passageways 272 are desirably enlarged or otherwise modified to smooth or improve the retraction movements of a specific collapsible core 200 is often best determined by trial and error observation and testing.

Figure 10:
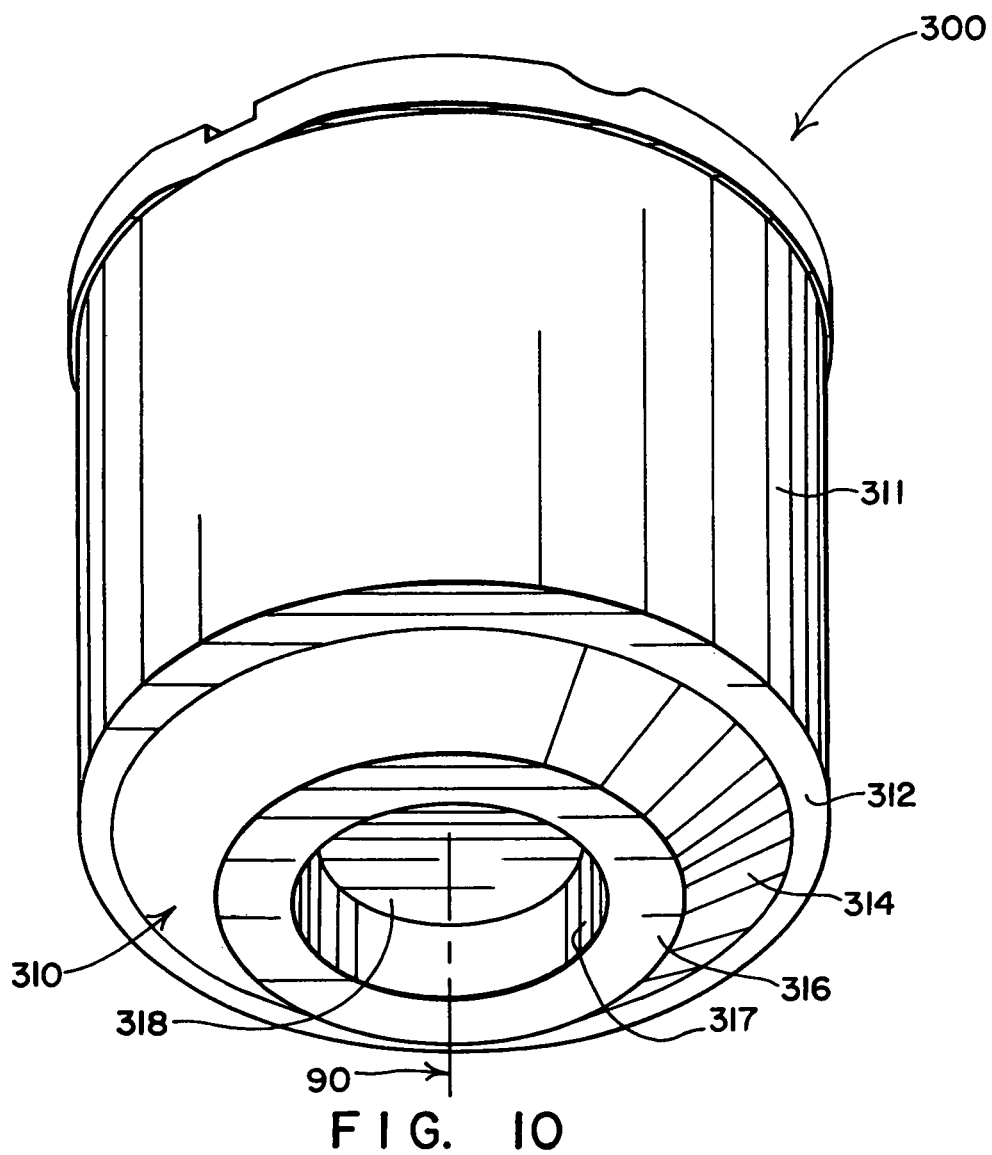
FIG. 10 is a perspective view of a generally cylindrical end cap component of the mold that is moved into engagement with the core components shown in FIG. 3 in a manner shown in cross-section in FIG. 11 when the mold is being made ready to receive a charge of molten thermoplastics material to form a product such as the example product shown in FIG. 2.

Turning to FIG. 10, the depicted end cap component or end cap 300 has a cylindrical exterior surface 311 that joins with a complexly shaped lower end surface 310. The complexly configured lower end surface 310 includes a set of progressively smaller annular ring surfaces 312, 314, 316 that extend concentrically about the center axis or centerline 90, and concentrically about a centrally located, circular flat surface 318.

As can best be seen in FIG. 10, the annular surface 312 is flat and extends radially inwardly from, and substantially perpendicular to, the cylindrical exterior 311 of the end cap 300. The annular surfaces 316 and 318 also are flat and extend substantially perpendicular to the cylindrical exterior surface 311 of the end cap 300. An inclined surface that forms the annular ring surface 314 provides a transition from the outer ring surface 312 to the inner ring surface 316. A generally cylindrical surface indicated by the numeral 317 encircles the center axis or centerline 90 and provides a transition from the ring surface 316 to the circular center surface 318.

When the circular center surface 318 of the end cap 300 is lowered or otherwise closed into engagement with the end surface 219 of the upstanding Y-shaped center formation 217 of the nest 210 as shown in FIG. 11, the annular ring surfaces 312, 314, 316 also extend into engagement with other components of the collapsible core assembly 200, as is shown in FIG. 11.

In operation, the components of the mold 100 shown in FIG. 1 are moved to operational positions shown in FIG. 11 to ready the mold 100 to receive a charge of molten thermoplastic material to mold a tubular product 500 such as is shown in FIG. 2. Other mold components (not shown) are typically also operationally positioned to de-fine end portions of a product to be formed by injection molding—such as the flange 505 shown in FIG. 2.

After a charge of molten thermoplastic material has been injected under pressure into the cavity 75 of the mold 100, and after a newly molded product has had enough time to solidify as heat energy is carried away from the mold 100 by water or other cooling fluid that preferably is circulated through cooling passages (not shown) formed through otherwise solid regions of the mold 100, the mold cavity 75 is opened by causing the left and right side components 110, 120 to separate by moving in opposite directions away from the core assembly 200, and by axially moving the end cap component 300 to disengage the core components that are depicted in FIG. 3.

Ejection of the newly formed product from the mold 100 is initiated as by raising of the ejection ring 400, moving it along the cylindrical exterior surface 211 of the nest 210 in a direction indicated by arrows 410 in FIG. 12. As a newly formed product 500 begins to be ejected from the mold 100, the relatively movable components of the collapsible core assembly 200 (which are still in intimate engagement with the newly molded set of interior threads 550 of the product 500) are caused to move in unison with the product 500 in axial directions indicated by the arrows 410.

However, when the pivotally movable flippers 220 begin to be caused to move in the direction of the arrows 410 due to engagement of their thread formations 222 with the newly formed threads 550, the pivotal mounting of the flippers 220 causes the flippers 220 to begin to pivot radially inwardly about the axes of the pivot pins 290. The radially inward pivotal movement of the flippers 220 about the axes of the pivot pins 290 begins causing the flippers 220 to progressively disengage from the newly formed interior threads 550 at a time before the lifters 230 have reason to begin to cause their thread formations 232 to begin progressively disengaging from the newly formed interior threads 550—so, during this early stage of retractive movement, the thread formations 232 of the lifters 230 remain fully engaged with the newly formed interior threads 550.

Because the thread formations 232 of the lifters 230 continue to be engaged with the newly formed interior threads 550 as the ejector ring 400 moves the newly formed product 500 in the direction of the arrows 410, the inclined surfaces 234, 236 at the rear of the lifters 230 are drawn away from the correspondingly inclined surfaces 244, 246 of the associated pockets 270 of the nest 210. In effect, the lifters 230 are caused to move parallel to the center axis or centerline 90, just as the newly formed product 500 is caused to move parallel to the center axis or centerline 90 by the axial movement of the ejection ring 400.

This axial movement of the lifters 230 delays for a very brief period of time the inevitable radial inward movement of the lifters 230 which eventually must take place due to the presence of the cap screws 274 in the inclined passageways 272 of the nest 210 which limit and guide how the lifters 230 are permitted to move. What observation and testing has discovered is that this delayed inward retractive movement of the lifters 230 (at such time as the radially inward pivotal movement of the flippers 220 is already in progress) is often needed in order to ensure that the flippers 220 and lifters 230 do not collide or jam during early portions of their respective and concurrent retractive movements.

To permit, and, indeed to enhance, the delayed radial retraction of the lifters 230 while the flippers 220 are already pivoting to move radially inwardly, the passageways 272 through which the cap screws 274 extend are preferably enlarged radially outwardly (as will be explained shortly in conjunction with FIG. 15) to permit the lifters 230 to move in the axial direction of the arrows 410 despite the tendency of the cap screws 274 to guide the lifters 230 so they translate in a linear fashion parallel to the inclined surfaces 244, 246 provided by the nest 210 at the back of each of the pockets 270.

What is shown in a somewhat schematic FIG. 15 is the upper end region of one of the passageways 272 as seen while looking at the bottom 267 of one of the pockets 270 in a direction indicated by arrows 15-15 in FIG. 12. Put in another way, the view of FIG. 15 looks at the upper end of one of the passageways 272 in a direction that parallels the inclined surfaces 244, 246 located at the rear of one of the nest pockets 270. In FIG. 15, the passageway 272 appears as a circular hole that is concentric about an axis 802 located at the juncture of the imaginary orthogonal lines 800 and 801. The imaginary line 800 bisects the angle formed by the two inclined surfaces 244 at the back of the pocket 270, and intersects midway along the length of the curved transitional surface 246 that joins the two inclined surfaces 244.

As has been described, the passageway 272 extends parallel to the inclined surfaces 244, 246 of the nest 210, and is positioned to enable the inclined surfaces 234, 236 of an associated one of the lifters 230 to engage and slide along the inclined surfaces 244, 246 of the associated pocket 270. There are a variety of ways in which each of the passageways 272 can be slightly enlarged to permit the associated cap screws 274 that reside within the passageways 272 to deviate from maintaining engagement of their inclined rear surfaces 234, 236 with the inclined surfaces 244, 246, respectively, as the lifters 230 move between operational and retracted positions.

The somewhat schematic view of FIG. 15 illustrates some examples of approaches that can be taken to enlarge the passageways 272. Those skilled in the art will readily understand that FIG. 15 is not "to scale," but rather shows somewhat exaggerated depictions so that the small dimensions that are involved can be seen and understood.

One way in which the passageway 272 (which is sized to receive an associated one of the cap screws 272 in a slip fit) can be enlarged to more loosely receive its associated cap screw 274 is to replace the original passageway 272 with a slightly larger diameter passageway that is depicted in the schematic illustration of FIG. 15 by a larger circle labeled with the numeral 273. The larger diameter replacement passageway 273 will permit its cap screw 274 to enable the associated lifter 230 to move away from engagement with the back of the associated pocket 270 of the nest 210—which is to say that the inclined surfaces 234, 236 of the lifter 230 will be permitted to separate from the inclined surfaces 244, 246 of the associated pocket 270.

If a larger replacement passageway 273 is to be provided, a preferred way of doing this is to displace the imaginary centerline 803 (about which the larger passageway 273 is concentric) by a small amount in a direction extending away from the curved transitional surface 246 (i.e., in a leftward direction along the imaginary line 800, as things are oriented in FIG. 15). If, for example, the replacement passageway has a radius that is 0.0188 inches larger than the radius of the original passageway 272, then the centerline 803 is preferably displaced leftwardly along the imaginary line 800 by the same 0.0188 inch distance from the centerline 802—and, in preferred practice, the diameter of the passageway 273 is 2×0.0188=0.0376 inches larger than the diameter of the original passageway 272, which causes the original and the replacement passageways 272, 273, respectively, to be coincident at a point closest to the transitional surface 246.

It is desirable that the original and the replacement passageways 272, 273 be coincident (as shown in FIG. 15) because this ensures that a cap screw 274 installed in the replacement passageway 273 can cause its associated lifter 230 to engage the back of the associated pocket 270 just as the same as if the cap screw 274 were installed in the original passageway 272—hence, the lifter 230 can assume the operational position shown in FIGS. 1, 3 and 11, and can assume the retracted position shown in FIGS. 12-14 (while also moving away from the back of the associated pocket 270 during travel between the operational and retracted positions).

Other small dimensions can be used in place of the example 0.0188 inch dimension shown in FIG. 15, as those skilled in the art will readily understand. The 0.0188 inch dimension is provided simply as an example—and typifies the small dimensions of a few thousandths or ten thousandths of an inch that are recommended for enlarging the passageway 272 and for displacing the axis 803 of a replacement passageway 273.

Yet another way in which either of the passageways 272 or 273 can be slightly enlarged is shown by a curved broken line 275 in FIG. 15—which shows how all or only an appropriate end region of the passageway 273 can be enlarged by hand filing or the like to ensure that a cap screw 274 will be adequately loosely received in the enlarged passageway (in this example, the enlarged passageway is 273, but it could be the passageway 272) to enable the associated lifter 230 to delay its radially inward movement long enough for adjacent ones of the flippers 220 to pivot radially inwardly so that no collision or jamming occurs once the lifter 230 is caused by its associated cap screw 274 to begin moving in a direction paralleling the passageway 272 or 273 or the enlarged passageway 275 through which the cap screw 274 extends. If hand filing is used to provide enlargement of one of the passageways 272, 273 (or a portion thereof), the enlargement will, of course, be quite small—typically only in the range of a few thousandths of an inch at most.

What enlargement of the passageways 272 permits is for the lifters 230 to initially move in an axial direction (indicated by the arrows 410 in FIGS. 11 and 12) with a newly formed product 500—which axial movement of the lifters 230 is caused by engagement of the thread formations 232 of the lifters 230 with the newly formed interior threads 550 of the product 500 which is being ejected by axial movement in the direction of the arrows 410 by the ejection ring 400. But purely axial movement of the lifters 410 is not long permitted to continue, for the cap screws 274 (that are carried in the inclined passageways 272, 273 or 275) soon begin to cause radially inward movement of the lifters 230, so the lifters 230 begin to move more in directions that parallel the inclined passageways 272, 273 or 275.

Once the lifters 230 begin to deviate from moving purely axially (in the direction of the arrows 410) and start to move radially inwardly so the movement of the lifters 230 occurs in directions that extend more parallel to the directions of the associated passageways 272, 273 or 275 through which the associated cap screws 274 extend, the thread formations 233 of the lifters 230 are caused to progressively disengage the newly formed interior threads 550. Still further movements of the flippers 220 and the lifters 230 causes the thread formations 222, 232, respectively, to fully disengage from the newly formed interior threads 550, thereby freeing the newly formed product 500 to continue to move with the ejection ring 400 in the direction of the arrows 410, which completes the process of ejecting the newly formed product 500 from the mold 100.

The retractive movements of the flippers 220 and the lifters 230 is unusual in that these movements are not only triggered by, but also carried to completion by ejection movement of the newly molded product 500. Since the purpose of these retractive movements is to disengage the thread formations 222, 232 of the flippers 220 and lifters 230, respectively, from the newly formed set of female threads 550 on the interior of the product 500, the retractive movements of the flippers 220 and the lifters 230 need not extend to a degree beyond that which is required to disengage the thread formations 222, 232 from the female threads 500—which is to say that the retractive movements may not cause the flippers 220 and/or the lifters 230 to assume the fully retracted positions that are illustrated in FIGS. 12-14. Some of the flippers 220 and/or some of the lifters 230 may not move to the depicted fully retracted positions, because their associated thread formations 222, 232 may have disengaged from the newly formed female threads 550 before the flippers 220 and lifters 230, respectively, have reached the fully retracted positions.

Although the retractive movements of the flippers 220 and the lifters 230 normally tend to take place in a substantially concurrent manner, it should be understood that none of the flippers 220 and lifters 230 are drivingly connected to cause such concurrent movement. Rather, if the flippers 220 and lifters 230 move concurrently, this is the result of the female threads 550 concurrently drivingly engaging the thread formations 222, 232 of the flippers 220 and lifters 230, respectively, so as to cause concurrent movement of the flippers and lifters 220, 230 in response to ejection movement of a newly formed product 500.

What is important about the retractive movements of the flippers 220 and the lifters 230 is simply that these relatively movable components of the collapsible core assembly 200 be retractively movable from the operational positions shown in FIGS. 1, 3 and 11 toward the retracted positions shown in FIGS. 12-14 as smoothly as possible, without being caused to collide or jam. Differently configured flippers 220 and lifters 230 (such as may be needed to define interior threads 550 of different types and/or sizes)—or the use of differing numbers of flippers 220 and lifters 230 (such as may be needed to form much larger or much smaller diameter sets of interior threads 550), will undoubtedly necessitate that the flippers 220 and the lifters 230 be modified to different degrees to provide smooth retractive movements.

An advantage provided by the flippers 220 and the lifters 230 (i.e., the thread-forming components of the present invention) is that they initiate and complete their retractive movement in response to the initiation and continuation of ejection of a newly formed product 500—which is quite unlike what takes place with previously known types of interior thread-forming core elements that require cycle time to be lengthened by waiting for thread forming components to be retracted (typically as by "unscrewing" from engagement with newly formed threads) at a time before product ejection can commence. What this means is that the cycle time of the mold 100 (i.e., the time measured in seconds that it takes to form and eject a new product 500 from the mold 100 before a new mold cycle can begin) is diminished by not having to wait until core components have been retracted and fully disengaged from newly formed interior threads before product ejection can even begin.

Hence, product ejection can begin at an earlier time because product ejection is what causes retractive movement of the thread forming components of the mold 100 to take place. Moreover, because the thread forming components 220, 230 remain engaged with the newly formed female interior threads 550 during early seconds of product ejection, this prolonged engagement with the threads 550 not only assists in maintaining the configuration of the newly formed interior threads 550 during product ejection, but also helps to carry away heat energy from the region of the newly formed threads 550, which is believed to aid in stabilizing, strengthening and solidifying the thermoplastic material of a newly formed product 500 in the vicinity of the newly formed threads 550 as well as permitting cycle time to be diminished so that a larger number of new products 500 can be sequentially produced in and ejected from the mold cavity 75 during a given period of time.

As will be apparent from the foregoing description, the method and the collapsible core assembly of the present invention are well suited to the formation of a wide variety of interior formations within portions of products being created by molding—wherein the interior formations to be provided have projecting portions that extend in directions substantially transverse to, or recessed regions that retreat in directions substantially transverse to the axial direction of movement (e.g., an axial direction indicated by the arrows 410 in FIGS. 11 and 12) of ejection members (e.g., the ejection ring 400).

Such transversely extending interior formations obstruct the ejection of newly formed products as by axial movement (in directions paralleling the center axis or centerline 90) unless such core components as were used to form the transversely extending interior formations are somehow withdrawn from engagement with the transversely extending formations—which is what the collapsible core of the present invention provides for, by employing at least two separate sets of relatively movable core components that retractively move to different locations where none of the sets of retractively positioned core components obstructs the axially inward retractive movement of the components of any of the other sets.

Although the embodiment shown in the drawings of the present application utilizes only two separate sets of relatively movable core components that move retractively to a total of only two separate axially spaced locations, other embodiments of the invention could employ two sets of relatively movable components that move retractively to a total of more than two separate locations—or, alternatively, could employ more than two sets of relatively movable components that retractively move to more than two separate locations—all of which embodiments would be within the spirit and scope of the present invention.

Although features of the present invention described in this document have mainly focused on the construction and arrangement of components of a new and improved form of collapsible core assembly 200, still other features of the present invention reside in improved methods of molding that enable undercut formations such as the set of female threads 550 to be molded on interior regions of products that are formed by injection molding and the like. As those skilled in the art will readily appreciate and understand, the present invention provides new and improved methods whereby such undercut formations as continuously extending sets of interior threads can be formed during the molding of products—methods that call for the use of separate sets of thread-forming components in a collapsible core that move differently while retracting to separate locations spaced axially along a center axis or centerline of the core, and methods that call for thread-forming components to execute retractive movements when triggered by, and implemented by, an ejection movement of a newly formed product. In short, the present invention extends not only to improved features of injection molds, but also to improved methods of injection molding.

Although the mold and collapsible core combination shown in the accompanying drawings is primarily intended for use with thermoplastic materials, those skilled in the art will readily appreciate and understand that the disclosed preferred embodiment (and other mold and collapsible core combinations that embody features of the present invention) can also be used with aluminum, zinc, wax and other moldable materials to create products that have internal components with transversely extending or undercut formations that cannot be formed simply by core components that move along center axes such as the axis 90 that is shown in several of the accompanying drawings. The present invention is not limited in its use to particular types of moldable materials, but rather is quite versatile in its application to the art of molding.

Although features of the present invention have been described in a preferred form with particularity, it is understood that the disclosures herein of various elements, components, parts, methods and embodiments have been made only by way of example, and that numerous modifications in the details of construction, combination and arrangement of what is disclosed can be resorted to without departing from the spirit and scope of the invention, as claimed.

What is claimed is:

1. A collapsible core assembly comprising:
   first and second sets of thread forming components that cooperate when operationally positioned to form a set of continuously extending female threads within an interior of a product molded around a portion of the core assembly, and that retractively move after forming the threads to different locations where the components are disengaged from the newly formed threads, wherein the first and second sets of thread forming components are configured to execute distinctly different types of retractive movement while traveling to the different locations; and
   a nest component to which the thread forming components of the first and second set are individually movably connected, wherein the nest component is provided with passageways through which elongate elements extend that are connected to the components of the second set that delay disengagement of the components of the second set from newly formed interior threads of a newly formed product until after components of the first set have begun to disengage from the newly formed interior threads.

2. The collapsible core assembly of claim 1 in which the first and second sets of thread forming components are configured to retractively move in response to an ejection movement of the newly molded product.

3. The collapsible core assembly of claim 1 additionally including mold components that define a mold cavity extending perimetrically around the portion of the collapsible core assembly, and including an ejection member capable of executing an ejection movement of the product relative to said mold components.

4. The collapsible core assembly of claim 3 in which the first and second sets of thread forming components are configured to retractively move in response to the ejection movement.

5. The collapsible core assembly of claim 1 in which the collapsible core assembly is configured to extend along a center axis when the first and second sets of thread forming components are operationally positioned, and the different locations are spaced along the center axis.

6. The collapsible core assembly of claim 1 in which the distinctly different types of retractive movement include pivotal movement of the first set of thread forming components.

7. The collapsible core assembly of claim 1 in which the distinctly different types of retractive movement include translation movement of the second set of thread forming components.

8. The collapsible core assembly of claim 1 in which the distinctly different types of retractive movement include principally pivotal movement of the first set of thread forming components, and principally translation movement of the second set of thread forming components.

9. The collapsible core assembly of claim 1 in which the components of the first set are configured to be interleaved among the components of the second set when the first and second sets of components are operationally positioned.

10. A collapsible core assembly comprising a nest component, and first and second sets of interior formation forming components that are individually movably connected to the nest component for being operationally positioned to cooperate in forming a set of interior formations within an interior of a product molded around a portion of the core assembly, and for being retractively moved after forming the interior formations to distinctly different locations where the components of the first and second sets are disengaged from the newly formed interior formations, and with the disengagement of the components of the second set from the newly formed interior formations being delayed until after components of the first set have begun to disengage from the newly formed interior formations.

11. The collapsible core assembly of claim 10 in which the first and second sets of interior formation forming components are configured to retractively move in response to an ejection movement of the newly molded product.

12. The collapsible core assembly of claim 10 additionally including at least two further mold components that cooperate to define a mold cavity that extends perimetrically around the portion of the collapsible core assembly, and including an ejection member that is movable to cause ejection movement of the product relative to the at least two further mold components.

13. The collapsible core assembly of claim 12 in which the first and second sets of interior formation forming components are configured to retractively move in response to the ejection movement.

14. The collapsible core assembly of claim 10 in which the collapsible core assembly is configured to extend along a center axis when the first and second sets of interior formation forming components are operationally positioned, and the distinctively different locations are spaced along the center axis.

15. The collapsible core assembly of claim 10 in which the first and second sets of interior formation forming components are configured to execute distinctly different types of retractive movement while traveling to the distinctively different locations.

16. The collapsible core assembly of claim 15 in which the distinctly different types of retractive movement include pivotal movement of the first set of interior formation forming components.

17. The collapsible core assembly of claim 16 in which the distinctly different types of retractive movement include translation movement of the second set of interior formation forming components.

18. The collapsible core assembly of claim 17 wherein the interior formation cooperatively formed by the first and second set of interior formation forming components is a continuous set of female threads.

* * * * *